UNITED STATES PATENT OFFICE 2,483,791

DIENE ADDITION PRODUCT AND PROCESS FOR MAKING IT

Howard M. Teeter, Charles R. Scholfield, and John C. Cowan, Peoria, Ill., assignors to The United States of America as represented by the Secretary of Agriculture No Drawing. Application July 19, 1946, Serial No. 684,915

21 Claims. (Cl. 260—404.8)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to formation of addition products of conjugated derivatives of polyunsaturated fatty acids with alpha, beta-unsaturated carbonyl compounds. It relates, in particular, to 1,4-diene adducts of alkyl esters of conjugated linoleic acid with crotonic acid nitrile or with alkyl esters of crotonic acid. It further relates to adducts of crotonic acid derivatives with conjugated dienic high molecular weight alcohols, derived by reducing alkyl esters of polyunsaturated higher fatty acids and isomerizing to form the conjugated compound.

One object of this invention is to provide valuable intermediates for the production of high polymeric materials.

A second object is to provide materials suitable for use as plasticizers, softeners, and tackifiers for synthetic resins, as lubricating oils and additions thereto, as corrosion inhibitors and for other purposes.

Other objects are apparent from the following specification.

Nonconjugated polyunsaturated fat acids, such as linoleic and linolenic acids, may be isomerized into conjugated forms by several methods; for example, the methods disclosed by Burr, United States Patent No. 2,242,230, or Bradley, United States Patent No. 2,350,583. Neutral derivatives thereof may be isomerized to conjugated forms by the method of Kass et al., United States patent application Ser. No. 564,500, filed November 21, 1944. This method consists of contacting the derivatives with finely divided metal of group VIII, of the periodic chart of elements, deposited on active carbon black at elevated temperatures, for example, above 150° C.

By neutral derivative is to be understood a derivative not containing a free carboxyl group, such as an ester, i. e., a glyceride or an alkyl ester, an alcohol, and so forth. A conjugated polyunsaturated fat acid contains a plurality of carbon-to-carbon double bonds alternated by single bonds; for example, 9,11-linoleic acid:

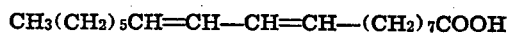

A non-conjugated polyunsaturated fat acid contains a plurality of such double bonds alternated by more than one single bond; for example, 9,12-linoleic acid:

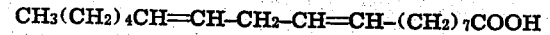

In many naturally occurring vegetable oils like soybean, corn, and sunflower oils, nonconjugated polyunsaturated fat acids, together with mono-unsaturated and saturated fat acids, are found in combination as the glyceride ester. The presence of the mono-unsaturated and saturated fat acid radicals does not prevent the isomerization of the polyunsaturated fat acid radicals in the glyceride or in any neutral derivative prepared from the mixed fat acids obtained from the glycerides by hydrolysis. Neither does the presence of the mono-unsaturated and saturated fat acid radicals interfere with the addition reactions of the isomerized polyunsaturated fat acid derivatives under the conditions described subsequently.

We have found that alkyl esters of conjugated polyunsaturated fat acids, in particular alkyl esters of conjugated linoleic acid, may be condensed, by means of an addition reaction, with derivatives of crotonic acid, particularly alkyl esters of crotonic acid and crotononitrile. The products are useful in the production of plasticizers, softening agents, and tackifiers, lubricating oils and additives thereto, and corrosion inhibitors. They are also valuable intermediates in the preparation of high polymeric materials.

Reaction between the conjugated fat acid esters and the crotonic acid derivative is effected by heating and agitating the reactants for 10 to 20 hours at 175° to 275° C. in an autoclave under the autogenic pressure so developed. It is convenient to employ a 1.5 to 10.0 molar excess (based on the amount of conjugated fat acid esters present) of the crotonic acid derivative. Following reaction, the product is isolated by distillation, whereby the reaction mixture is separated into four fractions: (1) recovered unreacted crotonic acid derivative; (2) recovered unreacted conjugated fat acid alkyl ester; (3) the addition product; and (4) a non-volatile residue which is believed to comprise polymers of the conjugated alkyl esters admixed with polymers of the crotonic acid derivative.

When certain vegetable oils are employed as a source of linoleic acid, particularly soybean oil, an intermediate fraction consisting of alkyl esters of arachidic acid may be obtained between fractions 2 and 3. If desired, alkyl arachidate may be removed by distillation of the alkyl esters prior to the addition reaction.

The first fraction is conveniently recovered by distillation at atmospheric pressure followed by stripping in vacuo. The second fraction is conveniently recovered by fractional distillation at a pressure of 1 to 3 mm., and the third fraction is isolated by distillation in a shortpath still at pressures less than 1 mm. The recovered unreacted alkyl ester of the fat acids and the crotonic acid derivative may be utilized for further preparations of the addition product, preferably after increasing the amount of conjugation therein by treatment according to the previously mentioned processes of isomerization.

If an isomerization catalyst similar to that of Kass et al., is employed, it is possible to conduct isomerization and addition of the crotonic acid derivative simultaneously. For example, nonconjugated alkyl esters of the fat acids of semi-drying oils are mixed with suitable amounts of isomerization catalyst and crotonic acid derivative, and the mixture is sealed in a steel autoclave and processed according to the procedures outlined above. Strong alkaline isomerization catalysts could not be used in this procedure, because crotonic acid and its derivatives are decomposed by heating with strong alkali.

It is believed that the alkyl esters of conjugated fat acids and the crotonic acid derivative react by 1,4-addition to give the products having the following structures I and II. For purposes of illustration only, the ester of conjugated fat acids is assumed to be methyl 10,12-linoleate. In the formulas, the group R may be, for example,

or $CH_2OH$ and the group R' may be, for example, $CO_2CH_3$, $CO_2C_2H_5$ or $C\equiv N$.

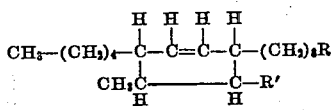

If esters of nonconjugated polyunsaturated fat acid are present in the reaction mixture as normally will be the case since no existing process of isomerization will completely convert such esters to their conjugated forms, reaction with crotonic acid derivatives may occur slowly to form products which differ from I and II, and which may have the structure III. For purposes of illustration, the ester of nonconjugated fat acid is assumed to be methyl 9,12-linoleate. The group R' may be, for example,

$C-OC_2H_5$, or $C\equiv N$.

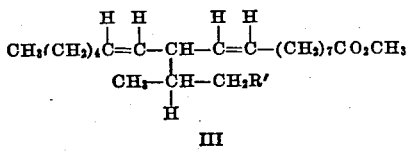

The reactions leading to I and II occur with ease, while that leading to III proceeds with comparative difficulty. Under the conditions contemplated by our invention, the reactions leading to I and II predominate, and the properties of our product show that it consists almost entirely (90 percent or more) of products having the structures I and II.

The product of our invention may be used without further treatment as a plasticizer for synthetic resins, in particular for polyvinyl chloride and polyvinyl chloride-acetate copolymers. It may also be used as a lubricant.

By transesterification of the addition product of ethyl crotonate and conjugated methyl esters of soybean fat acids in the presence of an alkaline catalyst, esters of the addition product, such as the 2-ethyl-n-hexyl, 2-ethyl-n-butyl and n-octyl esters, may be obtained. These esters may also be prepared by re-esterification with the desired alcohol of the dibasic acid formed by saponification of the addition product or by forming an addition product, according to the procedures described in this specification, from alkyl crotonates and conjugated alkyl esters of soybean fat acids wherein the alkyl radicals are 2-ethyl-n-hexyl, 2-ethyl-n-butyl, n-octyl, and so forth. In the latter case, the conditions of isolation and distillation of the product should be modified to take account of the lower volatility of these higher alkyl esters. The higher alkyl esters are valuable lubricants, with or without subsequent hydrogenation of their ethylenic unsaturation.

The products, as such, or after saponification or hydrolysis to yield the corresponding dibasic acid, are useful for condensation with polyfunctional alcohols, amines, and so forth, in the production of polymeric materials.

The products after reduction of the ethylenic unsaturation therein are also suitable for use as intermediates in the production of polymers, as plasticizers, as lubricants, and so forth.

If crotonitrile is used as adduct to the ester of conjugated polyunsaturated fat acid, the product may be hydrogenated with resulting conversion of the nitrile group to an amino-methyl group. Saponification of the remaining ester group yields an amino acid which may be self-condensed to form a polyamide or which may be employed in the preparation of other polymeric materials.

Alkyl esters of conjugated linoleic acid, either alone or in the form of alkyl esters of fat acids of conjugated semi-drying oils, may be reduced by well-known means, for example, sodium and alcohol, to the corresponding alcohols. According to another procedure, alkyl esters of nonconjugated linoleic acid or of fat acids for nonconjugated semi-drying oils may be reduced with sodium and alcohol to the corresponding alcohols, and the alcohols may be isomerized to conjugated forms by treatment with an isomerization catalyst. These alcohols, conjugated linoleyl alcohol and conjugated alcohols of semi-drying oils may be employed in addition reactions with crotonic acid derivatives, as described above. The same considerations apply in this case as when conjugated alkyl esters are employed.

The addition product of such conjugated alcohols and alkyl esters of crotonic acid may be saponified to an hydroxy acid which may be self-condensed to form a polyester, or which may be utilized in the preparation of other polymeric materials.

EXAMPLE I

Methyl esters of soybean oil were treated with a nickel-carbon isomerization catalyst, prepared according to the directions of Kass et al., United States patent application Ser. No. 564,500, for 6 hours at 170° C. The product contained 37.5 percent conjugation as determined spectrophotometrically. Sixty grams of the conjugated esters was mixed with 86 grams of ethyl crotonate, giving a ratio of 10 mols of ethyl crotonate per mol of conjugated material in the treated methyl esters, and the mixture was sealed in a steel autoclave. After heating and shaking at 245° to 260° C. for 10 hours, the reaction mixture was cooled, transferred to a still equipped with a concentric tube fractionating column, and distilled in vacuo. After recovery of unreacted ethyl crotonate, 42.4 grams of unreacted methyl esters was recovered. The residue was transferred to a shortpath pot still and by distillation at 0.5 mm. pressure and 207° to 217° C., 23.9 grams of the addition product was isolated. The yield was 76.5 percent based on the weight of conjugated esters originally present.

The product was a pale yellow liquid of pleasant odor. Its density was 0.9480 at 30° C.; its refractive index at 29° C. was 1.4651; its iodine number was 64.6; its molecular weight was 427; and it contained 73.8 percent carbon and 10.84 percent hydrogen. The calculated analysis for a compound of structure I or II ($R=CO_2C_2H_5$) is 73.5 percent carbon, 10.78 percent hydrogen, iodine value of 62.0, and molecular weight of 408. The product could be hydrogenated with a platinum catalyst at atmospheric pressure, 475 grams of product being required to absorb 2.016 grams of hydrogen.

EXAMPLE II

An experiment identical to that in Example I was performed, except that the reaction mixture was heated for 20 hours at 185° to 188° C. A 53 percent yield of addition product was obtained.

EXAMPLE III

In the steel autoclave 45 grams of methyl esters of soybean fat acids, 87 grams of ethyl crotonate and 8 grams of an activated nickel-carbon isomerization catalyst were heated and shaken for 10 hours at 220° to 300° C. By the procedure described in Example I, 13.6 grams (62 percent of theoretical, calculated upon the assumption that the isomerization catalyst produced 35 percent conjugation) of the addition product, was obtained.

EXAMPLE IV

Methyl esters of soybean fat acids were reduced by treatment with sodium and ethanol, and the resulting alcohols were conjugated by heating with a nickel-carbon catalyst at 170° C. for 6 hours. The conjugated alcohols contained 35 percent diene conjugation.

In a steel autoclave 26.7 grams of the conjugated alcohols and 40.3 grams of ethyl crotonate (corresponding to a 10-mol excess based on weight of completely conjugated alcohols present) were heated and shaken for 10 hours at 238° to 260° C. The reaction mixture was distilled through a concentric tube fractionating column, and after recovery of ethyl crotonate, 14.2 grams of unreacted alcohols distilled at 0.44 mm. pressure. The residue was transferred to a small Claisen flask and distilled at 0.17 to 0.29 mm. pressure. A yield of 5.1 grams (38.2 percent) of an addition product was obtained by collecting the fraction boiling at 226° to 230° C. Analysis showed 76.17 percent of carbon and 11.10 percent of hydrogen. The calculated values for a compound of structure I or II

($R=CH_2OH, R'=CO_2C_2H_5$)

are 76.2 percent carbon and 11.18 percent hydrogen.

EXAMPLE V

In this sample, the same conjugated methyl esters of soybean fat acids employed in Example I were used. These esters contained 37.5 percent of conjugation. To 41 grams of the esters was added 35.2 grams of crotononitrile, representing 10 mols of the latter per mol of completely conjugated material in the soybean esters, and the mixture was heated and shaken for 10 hours at 240° to 250° C. in an autoclave.

By distillation 27.1 grams of unreacted crotononitrile was recover, which was reacted in the autoclave with 31.7 grams of fresh methyl esters of conjugated soybean fat acids. From this reaction mixture, 20.5 grams of unreacted crotononitrile was recovered.

The residues remaining after recovery of crotononitrile from the two runs with the autoclave were combined and distilled. There was obtained by distillation at 1 to 5 mm. pressure 43.9 grams of unreacted methyl esters of soybean oil, and by distillation at 0.5 mm. pressure 21 grams (62.5 percent yield) of an addition product.

The product contained 76.5 percent carbon, 10.77 percent hydrogen, and 4.06 percent nitrogen. Its refractive index at 29.7° C. was 1.4749, its density at 30° C. was 0.9488, and its iodine value was 72.3.

A compound of structure I or II ($R=CN$) should contain 76.5 percent carbon, 10.79 percent hydrogen, and 3.88 percent nitrogen, and its iodine number should be 70.4.

EXAMPLE VI

A 20-gram sample of the addition product obtained in Example I was saponified by refluxing 3.5 hours with a solution of 15 grams of potassium hydroxide in 60 ml. of ethylene glycol. Ethanol may also be used instead of the glycol. The product was isolated by acidification and extraction of the reaction mixture, and it was found to have a neutral equivalent of 185.8. The calculated value for the neutral equivalent of the dibasic acid corresponding to structure I or II ($R=CO_2C_2H_5$) is 183.

EXAMPLE VII

Samples of the addition product obtained in Example I were examined for compatibility with a variety of commercially useful resins and plastics. Solutions of each resin were prepared which contained 0.25 gram, 0.75 gram, and 2.25 grams of resin in 10 ml. of solvent. To each solution was added 0.25 gram of the addition product. Films were prepared from each solution which were inspected for cloudiness, bleeding, or other indication of incompatibility. The results are shown in the table, where the letter "C" indicates compatibility, and the letter "I", incompatibility.

Table

| Resin | Solvent | Ratio of addition product to resin | | |
|---|---|---|---|---|
| | | 1:1 | 1:3 | 1:9 |
| Nitrocellulose (R. S. ½ sec.) | Ethyl acetate | C | C | C |
| Cellulose acetate | Acetone | C | C | C |
| Cellulose acetate butyrate | ....do | C | I | C |
| Vinyl chloride-vinyl acetate copolymer | Dioxane-methyl ethyl ketone (1:1) | C | C | C |
| Ethyl cellulose | Ethanol-toluene (4:1) | C | C | C |
| Rosin modified maleic resin | Toluene | C | C | C |
| Ester gum | ....do | C | C | C |
| Polystyrene | ....do | C | C | C |
| Methyl methacrylate polymer | Acetone | C | C | C |

Example VIII

The addition product of ethyl crotonate and conjugated soybean methyl esters was compared with dioctyl phthalate as a plasticizer for vinyl chloride (95 percent)-vinyl acetate (5 percent) copolymer. The formula used for the tests was:

Parts by weight
Resin _____ 63.5
Basic lead carbonate _____ 1.0
Stearic acid, U. S. P _____ 0.5
Plasticizer _____ 35.0

After milling and sheeting, physical properties were determined with the following results:

| Plasticizer | Compatibility | Heat stability | Min. flex. | Elongation at 1,000 pounds |
|---|---|---|---|---|
| | | Hours | °C. | Per cent |
| Addition product | Complete | 4.5 to 5.0 | −17 | 81 |
| Dioctyl phthalate | ...do | 4.0 to 4.5 | −21 | 87 |

Example IX

Kinematic viscosity measurements were made upon the addition product of ethyl crotonate and conjugated soybean methyl esters, upon the same substance after catalytic reduction of its ethylenic unsaturation with hydrogen, upon several higher alkyl esters of the addition product, and upon several commercial motor oils. The results were as follows:

| | Kinematic viscosity | | Viscosity index |
|---|---|---|---|
| | 100° F. | 210° F. | |
| Addition product (1) | 27.1 | 4.66 | 94.7 |
| Hydrogenated addition product | 28.6 | 4.87 | 101.0 |
| Commercial oil No. 1 | 45.5 | 5.22 | 9.29 |
| Commercial oil No. 2 | 34.3 | 5.71 | 117.0 |
| 2-Ethyl-n-hexyl ester of I | 34.8 | 5.49 | 103.0 |
| 2-Ethyl-n-butyl ester of I | 35.8 | 5.63 | 105.0 |
| n-Octyl ester of I | 38.9 | 6.21 | 117.0 |

The following three examples illustrate the preparation of the catalyst.

Example X 192 grams of nickel formate are dissolved in 5,500 ml. of hot, distilled water. The solution is filtered and added to 210 grams of activated carbon. A suitable activated carbon may be prepared from sulfite wastes resulting from sulfite-pulping process by burning at 900° C. followed by neutralizing the resulting carbon with hydrochloric acid, and copiously washing it to remove excess acids, salts, and other impurities. This suspension is evaporated by boiling until a 25 to 50 percent moisture content is obtained. The catalyst composition is then ready for activation by reduction with hydrogen.

Example XI 116 grams of nickelous nitrate are dissolved in 160 ml. of distilled water and thoroughly ground with 105 grams of activated carbon. The mixture is added slowly to a solution of 68 grams of ammonium carbonate in 400 ml. of water, mixed, and filtered. The filter cake is washed with 200 milliliters of distilled water, dried at 100° to 150° C., and ground to a fine powder. The catalyst composition is then ready for activation by reduction with hydrogen.

The catalyst compositions may be activated by reduction with hydrogen in the following manner:

Example XII 24 grams (dry weight basis) of catalyst composition, prepared by the method of Example X, are placed in a 500 ml. three-neck round-bottom flask fitted with a Hershberg stirrer constructed of nichrome wire, an inlet gas tube reaching as close to the bottom of the flask as possible, a funnel with a stopcock, a thermometer, and a gas outlet tube. Hydrogen is passed over the catalyst composition, and the temperature raised rapidly to about 360° C. The composition is then stirred intimately with the hydrogen at 360°±40° C. for two hours. The hydrogen is replaced with carbon dioxide, and the flask and contents are cooled to below 170° C. The catalyst may be used immediately or stored in vegetable oil under carbon dioxide, nitrogen, or other protective gas. In the reduction of the nickel in the catalyst, other types of apparatus can be used, but proper precautions must be observed to obtain intimate contact between catalyst composition and the hydrogen and to exclude oxygen.

Having thus described our invention, we claim:

1. The process of making a 1,4-diene adduct, comprising reacting a conjugated dienic high molecular weight alcohol having the carbon skeleton of a soybean oil fatty acid with ethyl crotonate for 10 to 20 hours at 175° to 275° C.

2. A 1,4-diene adduct of an alkyl ester of a conjugated soybean oil fatty acid with ethyl crotonate the alkyl group having no more than eight carbon atoms.

3. A 1,4-diene adduct of an alkyl ester of a conjugated soybean oil fatty acid with crotononitrile.

4. A 1,4-diene adduct of a conjugated dienic high molecular weight alcohol having the carbon skeleton of a soybean oil fatty acid and ethyl crotonate.

5. A 1,4-diene adduct of an alkyl crotonate and an ester of the fat acids of conjugated semi-drying oils with monohydric alkanols, the alkyl groups each being alkyl hydrocarbon radicals having no more than eight carbon radicals.

6. A 1,4-diene adduct of an alkyl crotonate and a conjugated dienic high molecular weight alcohol having the carbon skeleton of fat acids of semi-drying oils, the alkyl group of the crotonate having no more than eight carbon atoms.

7. A 1,4-adduct of an alkyl ester of 9,11-linoleic acid and an alkyl crotonate, the alkyl group having no more than eight carbon atoms.

8. A 1,4-diene adduct of ethyl crotonate and a conjugated dienic alcohol having the carbon skeleton of 9,11-linoleic acid, of the formula:

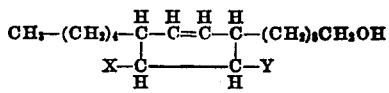

in which one of X and Y is CH₃ and the other is —COOC₂H₅.

9. A 1,4-diene adduct of an alkyl crotonate and a conjugated diene of the group consisting of: an ester of the fat acids of conjugated semi-drying oils with a monohydric alkanol, and a conjugated dienic high molecular weight alcohol having the carbon skeleton of a fat acid of a semi-drying oil; the alkyl of the crotonate and of the fat acid ester each having no more than eight carbon atoms.

10. The process of making a 1,4-diene adduct, comprising heating an alkyl crotonate with a conjugated diene compound of the group consisting of esters of the fat acids of conjugated semi-drying oils with monohydric alkanols, the alkyl groups each having no more than eight carbon atoms, and conjugated dienic high molecular weight alcohols having the carbon skeleton of fat acids of semi-drying oils, for several hours at about 175° to 275° C., and fractionally distilling the reaction mixture in vacuo to separate the 1,4-diene adduct.

11. The process of claim 10, in which the adduct is isolated by distillation at pressures less than 1 mm. of mercury.

12. The process of claim 10, in which the conjugated diene compound is produced in situ from the corresponding unconjugated diene compound by carrying out the reaction in the presence of an isomerization catalyst which does not decompose crotonic acid.

13. The process of claim 10, in which the conjugated diene compound is produced in situ from the corresponding unconjugated diene compound by carrying out the reaction in the presence of a neutral isomerization catalyst.

14. The process of claim 10, in which the conjugated diene compound is produced in situ from the corresponding unconjugated diene compound by carrying out the reaction in the presence of an isomerizing catalyst comprising a nickel-carbon catalyst.

15. The process of making a 1,4-diene adduct comprising reacting an alkyl ester of a polyunsaturated soybean oil fatty acid with an alkyl crotonate, by heating in the presence of an isomerizing catalyst that does not decompose crotonic acid.

16. The process of making a 1,4-diene adduct, comprising reacting a methyl ester of a polyunsaturated soybean oil fatty acid with ethyl crotonate by heating in the presence of a nickel-carbon isomerizing catalyst.

17. The process of claim 10, in which the 1,4-diene product is subjected to saponification to convert an ester group to a free carboxyl group.

18. The process of claim 10, in which the 1,4-diene product is subjected to hydrogenation to reduce its ethylenic unsaturation.

19. The process of making a 1,4-diene adduct, comprising reacting an alkyl crotonate with an ester of a fat acid of conjugated soybean oil and a monohydric alkanol for several hours at about 175° to 275° C., the alkyl groups each having no more than eight carbon atoms.

20. The process of making a 1,4-diene adduct comprising reacting ethyl crotonate with methyl ester of conjugated soybean oil fat acids for several hours at about 175° to 275° C.

21. The 1,4-diene adduct of methyl ester of 9,11-linoleic acid and ethyl crotonate, of the formula:

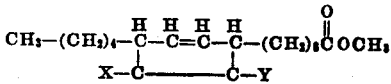

in which one of X and Y is CH₃ and the other is —COOC₂H₅.

HOWARD M. TEETER.
CHARLES R. SCHOLFIELD.
JOHN C. COWAN.

REFERENCES CITED

The following references are of record in the file of this patent:

UNITED STATES PATENTS

| Number | Name | Date |
|---|---|---|
| 2,365,363 | Swain | Dec. 19, 1944 |
| 2,375,937 | Miller et al. | May 15, 1945 |